H. WEICHSEL.
DYNAMO-ELECTRIC MACHINE.
APPLICATION FILED DEC. 17, 1920.
1,411,393.
Patented Apr. 4, 1922.
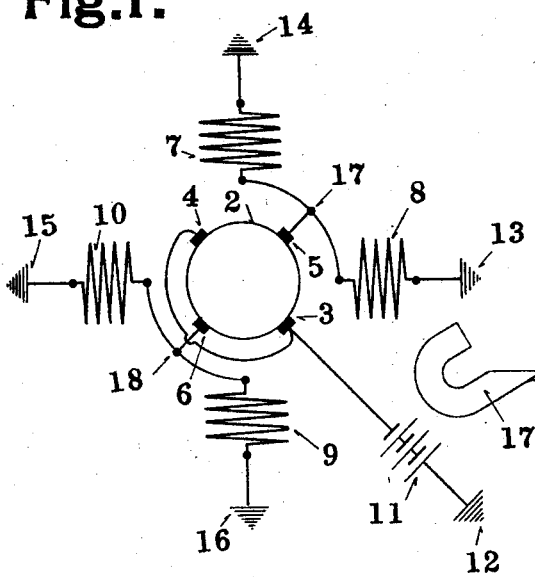
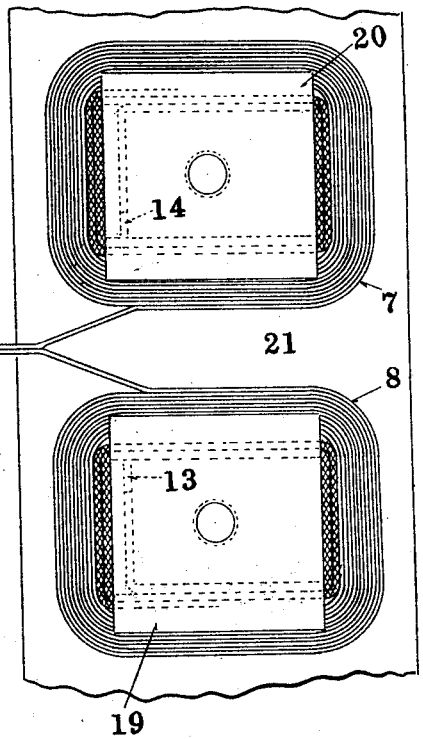
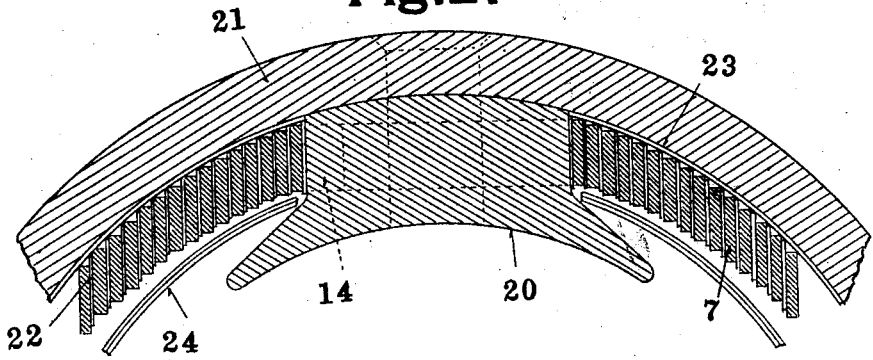
INVENTOR
Hans Weichsel
BY
E. C. Huffman
ATTORNEY

UNITED STATES PATENT OFFICE.

HANS WEICHSEL, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

1,411,393. Specification of Letters Patent. Patented Apr. 4, 1922.

Application filed December 17, 1920. Serial No. 431,325.

*To all whom it may concern:*

Be it known that I, HANS WEICHSEL, a citizen of Germany, residing at the city of St. Louis, State of Missouri, United States of America, have invented a certain new and useful Dynamo-Electric Machine, of which the following is such a full, clear, and exact description as will enable any one skilled in the art to which it appertains to make and use the same, reference being had to the accompanying drawings, forming part of this specification.

My invention relates to dynamo electric machines, and particularly to direct current series motors designed to operate on very low voltage circuits such as are, for instance, used on motor cars. When such machines are required to develop very large turning efforts, they must be built to handle very large currents and when the capacity of the source of energy is limited it becomes of paramount importance to reduce the ohmic resistance of the machine to a minimum. In the case of motor cars the source of energy is a small battery usually consisting of only three cells and unless the ohmic resistance of the cranking motor fed by said battery is very small, a sufficient cranking torque will not be secured.

It is usual in installations of this kind to ground one terminal of the source as well as one terminal of the motor.

It has, heretofore, been usual in series motors of the kind referred to to connect all the field windings, regardless of the number of poles, either in parallel or in series with each other and with the armature of the motor, grounding one end of the circuit to the frame of the machine and connecting the other to an insulated terminal. In carrying out my invention, I connect all the field windings in parallel to each other and in series with the motor armature, separately grounding one end of each of the field windings. In case the motor has more than two poles and a brush stud or carrier for each pole, I divide the field windings into as many groups as there are brush studs of the same polarity and I connect each group to a different brush stud. Each brush stud may carry one or more brushes as is well understood.

My invention will be better understood by reference to the accompanying drawings in which Fig. 1 is a diagram of my improved connections as applied to a four pole motor. Fig. 2 is a cross section through one of the field windings and Fig. 3 is a plan view of two adjacent poles and their field windings.

Referring to Fig. 1 which illustrates a four pole series motor, the armature is provided with the commuted winding 2 with which co-operate four brushes, two of which are positive, while the two others are negative. Each brush is, of course, carried on a brush stud which, however, is not shown. Each of the four poles carries an exciting winding (7, 8, 9, 10). The winding 7 is grounded at 14; 8 at 13; 9 at 16; and 10 at 15. The brushes 3 and 4 are connected to one pole of the battery 11, the other pole of which, is grounded at 12. The positive brush 5 is connected to the field windings 7, 8 and the brush 6 to the field windings 9 and 10.

In order to be able to locate more copper in a given space, I prefer to employ strip copper for the field windings and to wind it flat, rather than on edge. In order to make a ground connection of low resistance, I preferably provide a slot such as 13 or 14 in the core of each pole, drive the end of the strip which should be grounded into this slot and braze or solder the copper to the iron. The first couple of turns of the field winding are entirely insulated in the usual way, but the rest of the turns are bare with independent insulating strips 22 inserted between turns. Other insulating strips 23 and 24 are placed between the field windings and the frame 21 and between the field windings and the pole horns. The ends of the adjacent coils which are not grounded are connected together, for instance as shown at 17 of Fig. 3 and the connection is so formed as to permit of ready conductive attachment to one of the brush studs.

It was found that this improved winding very considerably increased the torque of a motor of given dimensions cooperating with a battery of given capacity. In one instance, it was found that the resistance of the field winding was reduced from .0022 to .0013 of an ohm, while the resistance of the ground connection was reduced from .0014 of an ohm to a value so low that it could not be measured. The total resistance of a machine provided with a winding as heretofore used, was found to be .0073 of an ohm, while the resistance of the same machine when provided with my improved winding was reduced to .005 ohm. This improvement is in part due to the better grounding and in part to the fact that my improved form of winding permits more copper to be located in a given space. Without change of battery, the current taken by the motor when standing still was raised from 485 to 590 amperes and the torque was increased from 4.32 to 5.57 foot pounds.

Another advantage of the arrangement of field coils shown in Fig. 1 is that the brush 5 is thereby made to carry exactly the same current as brush 6. This results in a more equal wear in the two brushes.

Having fully described my invention what I claim as new and desire to secure by Letters Patent of the United States is:

1. A multipolar direct current motor having a plurality of field coils, the coils of its several poles being connected in parallel in groups, the number of groups corresponding to the number of commutator brush carriers of like polarity and each group being connected to one of said brush carriers.

2. A dynamo electric machine having a plurality of field poles and coils each field pole core being provided with an opening, and one end of each field coil being positioned in the opening in its pole and electrically connected thereto, said coils being of strip conducting material wound flat and said strips being of a width only slightly less than the length of the pole core.

In testimony whereof, I have hereunto set my hand and affixed my seal.

HANS WEICHSEL. [L. S.]